Patented Mar. 31, 1936

2,035,819

UNITED STATES PATENT OFFICE 2,035,819

METHOD OF MAKING RUBBER ARTICLES

Evelyn William Madge and Edward Arthur Murphy, Wylde Green, Birmingham, and Francis James Payne, Erdington, Birmingham, England, assignors to Dunlop Rubber Company Limited, London, England, a British company No Drawing. Application June 12, 1934, Serial No. 730,256. In Great Britain July 25, 1933

4 Claims. (Cl. 154—2)

This invention concerns improvements in or relating to the production of rubber articles from dispersions of or containing natural rubber latex.

The main object of the present invention is to modify the properties of the surface layers formed from the dispersion of or containing natural rubber latex in such manner as to make them possess the desirable tacky adhesiveness shown by a masticated rubber film as, for instance, when obtained by the evaporation of rubber solutions or doughs.

It is well known that sheets of rubber obtained by the evaporation of compounded latex are "dry" and non-adhesive and do not possess the desirable tacky adhesiveness shown by sheets obtained from ordinarily masticated rubber.

This property of rubber obtained from latex is at times disadvantageous as, for instance, in the assembly of plies of rubber latex proofed fabric. It has also been found difficult under normal conditions to stick dry latex to milled rubber without the use of solvents or auxiliary solutions.

This absence of tack has meant that material, for example weftless cord, canvas and other fabrics treated with latex compounds, have not been used extensively heretofore in constructions necessitating building up operations as, for example, in the production of tires and belting.

According to the present invention the method of modifying the properties of articles of or containing natural rubber latex and preferably in admixture with compounding and/or vulcanizing ingredients by any one or more operations such as spreading, impregnating, spraying, molding, extruding, dipping or electrophoresis, comprises coating or treating the finished or unfinished articles produced with a thin, preferably very thin, film of substantially uncompounded natural rubber latex and coagulating the uncoagulated film applied, preferably by drying, which operation is furthermore preferably carried out at low temperatures.

It is preferable to dry the article before applying the substantially uncompounded natural rubber latex coat as otherwise the heating of the composite material to induce drying will be favorable to sulphur and accelerator migration and tend to destroy the tack desired.

It is expedient to treat the set or formed but still wet articles with the surface film only where all drying operations are conducted at room temperatures.

It has been found that a microscopically thin film of substantially uncompounded natural rubber latex when dry exhibits just the desired degree of tackiness. This film of tacky rubber may be obtained, for example, by simply passing the material to be treated through natural rubber latex of any commercial variety. A preferable concentration of the latex is, for instance, in the neighborhood of about 20%. It is desirable that the latex employed should not contain any appreciable quantity of hygroscopic substances as, for instance, hygroscopic stabilizers, as the tackiness obtained with films from such latices tends to be transient. The presence of small amounts of hygroscopic substances is, however, not detrimental. It has also been found that the latex rubber surface film may be compounded with fillers up to a maximum figure of about 5% without appreciably affecting the tack. Surfaces of articles formed from compounded rubber dispersions and provided with a tacky film as above may be united in a manner similar to the joining of masticated rubber and the resulting article may then be vulcanized.

The substantially uncompounded film of rubber latex is so thin that it vulcanizes quite satisfactorily by migration of sulphur and/or accelerator from the body of the compounded latex rubber to which this film has been applied.

The best results as regards maximum tack and uniformity of tack are obtained by carrying out the drying of the substantially uncompounded rubber latex film applied in cold air, that is, at room temperature. It has been found that at higher temperatures sulphur passes more readily from the compounded latex rubber underneath the film to the uncompounded film and tends to destroy the uniformity of the tack of this film although good tack can still be obtained even if drying is carried out at higher temperatures, provided such temperatures do not exceed 50°-60° C. It has also been found that when the base material of rubber derived from rubber latex has been set by a coagulant, more uniform and better tack is obtained than if the base material has been set by drying. This is probably due to the fact that migration from the compounded rubber below the film to the substantially uncompounded surface film is prevented to a greater extent by a surface definitely set by coagulant, in comparison with a surface set by drying.

Furthermore, although usually the surface film applied is coagulated by drying, it also may be positively coagulated as, for instance, by the application of coagulants in the form of liquid or vapor, the coagulated film being thereafter dried.

If desired, the uncompounded natural rubber latex applied can be softened with oil. It is important, however, that the uncoagulated film of natural rubber latex applied should be substantially free from sulphur and powders.

What we claim is:—

1. A method of joining articles of unmasticated compounded rubber containing vulcanizing ingredients which comprises covering surfaces of said articles with a thin film of substantially uncompounded latex and of a thickness sufficiently slight to permit the penetration of sulphur therethrough from said compounded rubber at the vulcanizing temperature, coagulating the latex of said films to render them tacky, joining said surfaces and vulcanizing the resulting article.

2. A method of joining articles of unmasticated compounded rubber containing vulcanizing ingredients which comprises forming a microscopic film of uncompounded natural latex rubber by passing said articles through an uncompounded latex of not over 20% concentration and coagulating the resulting film, joining the surfaces thus coated with latex and vulcanizing the resulting structure to produce an article having substantially uniform vulcanization.

3. A method of joining articles of unmasticated compounded rubber containing vulcanizing ingredients which comprises coating surfaces of said articles with a film of microscopic thickness and of natural latex rubber containing less than 5% of added fillers and compounding ingredients, coagulating said films, joining the surfaces thus coated and vulcanizing the resulting structure to an article of substantially uniform vulcanization.

4. The process of claim 3 in which said film is dried at a temperature below 60° degrees C.

EVELYN WILLIAM MADGE.
EDWARD ARTHUR MURPHY.
FRANCIS JAMES PAYNE.